United States Patent [19]

Ng

[11] Patent Number: 5,050,000

[45] Date of Patent: Sep. 17, 1991

[54] ERROR DIFFUSION OF SUBCELLS IN DIGITAL HALFTONING

[75] Inventor: Yee S. Ng, Fairport, N.Y.

[73] Assignee: Eastman Kodak Company, Rochester, N.Y.

[21] Appl. No.: 525,583

[22] Filed: May 21, 1990

[51] Int. Cl.$^5$ .............................................. H04N 1/40
[52] U.S. Cl. ................... 358/298; 358/457; 358/466
[58] Field of Search ............... 358/455, 456, 457, 458, 358/459, 298, 465, 466

[56] References Cited

U.S. PATENT DOCUMENTS

| | | | |
|---|---|---|---|
| 4,196,454 | 4/1980 | Warren | 358/456 |
| 4,258,393 | 3/1981 | Ejiri et al. | 358/457 |
| 4,578,713 | 3/1986 | Tsao et al. | 358/456 |
| 4,680,645 | 7/1987 | Dispoto et al. | 358/298 |
| 4,733,230 | 3/1988 | Kurihara et al. | 340/728 |
| 4,876,611 | 10/1989 | Fischer et al. | 358/456 |
| 4,891,710 | 1/1990 | Nakazato et al. | 358/464 |

Primary Examiner—William M. Shoop, Jr.
Assistant Examiner—Larry Moskowitz
Attorney, Agent, or Firm—J. Gary Mohr

[57] ABSTRACT

A system for converting gray-level input data into binary output data and efficiently preserve much of the original sharpness information. The input data is divided into halftone cells which correspond to several pixels in the original image information. The halftone cells are further divided into subcells which correspond to a plurality of pixels in the halftone cell. The subcells are thresholded with a matrix of threshold values to determine which binary pixels are to be rendered. Any error between the rendered pixels and the average density value of the subcell input values is propagated to adjacent subcells. The thresholding of the subcell pixels can use a separate threshold value for the individual pixels or can use an average threshold value for the entire subcell.

11 Claims, 4 Drawing Sheets

| SUBCELL → | A | B | C | D |
|---|---|---|---|---|
| TOTAL INPUT DENSITY | 740 | 580 | 460 | 340 |
| AVERAGE INPUT DENSITY | 185 | 145 | 115 | 85 |
| ERROR FROM OTHER SUBCELL(S) | 0 | -35 | -35 | 31.25 |
| AVERAGE DENSITY DESIRED | 185 | 110 | 80 | 116.25 |
| AVERAGE DENSITY RENDERED | 255 | 127.5 | 0 | 0 |
| AVERAGE ERROR FOR SUBCELL | -70 | -17.5 | 80 | 116.25 |
| ERROR PROPOGATED TO RIGHT | -35 | -8.75 | 40 | 58.125 |
| ERROR PROPOGATED DOWNWARD | -35 | -8.75 | 40 | 58.125 |

| SUBCELL → | A | B | C | D |
|---|---|---|---|---|
| TOTAL INPUT DENSITY | 740 | 580 | 460 | 340 |
| AVERAGE INPUT DENSITY | 185 | 145 | 115 | 85 |
| ERROR FROM OTHER SUBCELL(S) | 0 | -35 | -35 | 95 |
| AVERAGE DENSITY DESIRED | 185 | 110 | 80 | 180 |
| AVERAGE DENSITY RENDERED | 255 | 0 | 0 | 0 |
| AVERAGE ERROR FOR SUBCELL | -70 | 110 | 80 | 180 |
| ERROR PROPOGATED TO RIGHT | -35 | 55 | 40 | 90 |
| ERROR PROPOGATED DOWNWARD | -35 | 55 | 40 | 90 |

ERROR DIFFUSION OF SUBCELLS IN DIGITAL HALFTONING

BACKGROUND OF THE INVENTION

1. Field of the Invention

This invention relates, in general, to pictorial communications and, more specifically, to signal processing techniques for use with the electronic copiers, printers, and like devices.

2. Description of the Prior Art

Digital halftoning can be used in devices or systems, such as copiers and printers, where the pixels of the image data are represented by digital values. Halftoning is frequently used when the rendering device, or print engine, does not have the same gray-level capability as the input information. In halftoning, halftone cells are created wherein the overall density of the halftone cell is expected to be equal to the density of a group of pixels in the original input data. This provides the appearance of the same gray-level density for the area without the need for a gray-level rendering device. The most frequent use of digital halftoning is associated with reproducing gray-level input data with a binary output device. Although the overall density of the cell appears to be near the desired density, some sharpness information is lost from the original pixel data with many conventional halftone processing systems.

Error diffusion is another technique which may be used to convert gray-level values to binary values, or to gray-level values with a smaller number of usable levels. However, if error diffusion is used alone, the process stability of a single pixel dot at high resolution is a usual concern. In some processing, error diffusion and digital halftoning can be used together to provide the proper data for rendering the image on a binary device. This can provide good process stability and more overall-area gray-levels. If error diffusion is applied to each pixel of the halftone cell, much of the sharpness of the original data is preserved. However, pixel-to-pixel error diffusion is computationally intensive and can present major speed and hardware restraints. Error diffusion between halftone cells is much more economical as far as processing time is concerned, but a degree of sharpness is sacrificed with this arrangement.

U.S. Pat. No. 4,680,645, issued on July 14, 1987, discloses a method for rendering gray-level image data by a binary device. According to this patent, pixel-to-pixel error diffusion is used in conjunction with a variable sized dot rendering system. The variable sizes are modulated by the error in the gray-levels diffused or propagated to other pixels. Halftone cells are not used in this system. The background section of the patent includes a general discussion on error diffusion at column 1, lines 42-64.

In order to obtain an improved digital halftoning system, it is desirable, and an object of this invention, to provide a system for converting gray-scale data into binary data which accurately represents the density and sharpness information in the original image with reduced computations.

SUMMARY OF THE INVENTION

There is disclosed herein a new and useful system which requires less computation than pixel-to-pixel error diffusion and preserves much of the sharpness information in the original input data. The original gray-level input data is divided into halftone cells which contain a plurality of pixels represented by corresponding gray-level digital values. The halftone cells are further subdivided into subcells and processed with a template or matrix of threshold values to determine whether binary pixels will be printed or rendered for the input pixels. Any error between the rendered pixels and the desired density of the subcell is propagated to other subcells in the image data. By using a combination of halftoning, subcell division, and error diffusion between subcells, the system of this invention is able to provide quality rendering of gray-level data without the amount of computations required by many prior art systems.

According to one specific embodiment of the invention, the average of the gray-level values for an entire subcell is used in a thresholding process to determine which pixels will be rendered by a binary device. The thresholding process takes the average input value for the subcell and compares this with individual threshold values for each pixel corresponding to the subcell. The average error to be propagated to another subcell is then determined by comparing the desired average value for the subcell to the value actually rendered for the same subcell. A portion of this error is propagated to the subcell located to the right of the originating subcell and another portion of the error is propagated to the subcell located below the error-determining subcell. The propagated errors are used to increase or decrease the average values of the gray-level data within the subcell which receives the error value. According to another embodiment of the invention, the thresholding process compares the average input value of the subcell with an average threshold value for all of the pixels in the subcell.

A third embodiment compares adjusted input density values for individual pixels in a subcell with corresponding individual threshold values to determine the pixels to be rendered. The overall average error for a subcell is then propagated to adjacent subcells to change the individual pixel desired density values. A fourth method uses regular thresholding between the pixels in a halftone cell and propagates the total error to the neighboring halftone cells. The same threshold matrix is used for all of the halftone cells.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figures 1, 2:
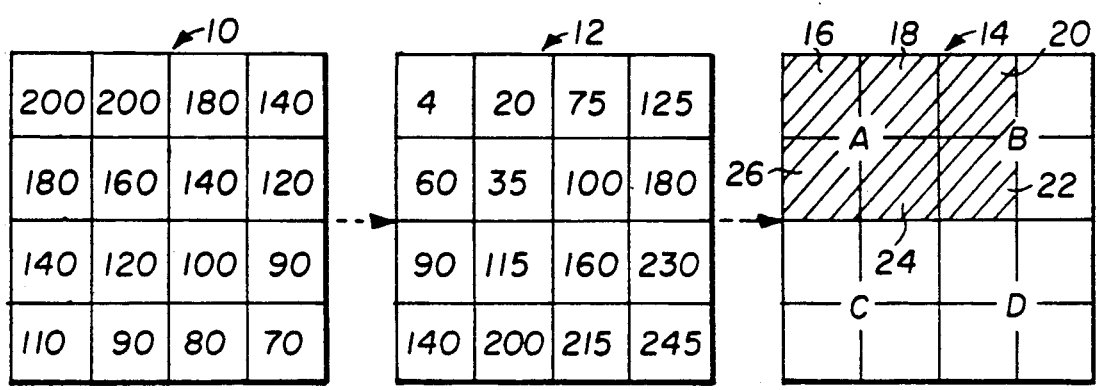
FIG. 1 is a diagram illustrating the development of a rendered halftone cell according to one embodiment of the invention.
FIG. 2 is a table of values used in the embodiment shown in FIG. 1.

Throughout the following description, similar reference characters refer to similar elements or members in all of the figures of the drawings.

Referring now to the drawings, and to FIG. 1 in particular, there is shown a diagram which illustrates the development of a rendered halftone cell. The original gray-level input data is divided into an input halftone cell 10 which, in this specific embodiment, is a 4×4 pixel input cell having specific digital values for each pixel, as shown. It is assumed that eight-bit, 0-255 level, digital values are used for the input data. It is emphasized that other digital values and bit levels may be used, and the size and shape of the halftone cell may be different than that indicated in FIG. 1.

The input data indicated in the halftone cell 10 is applied to a matrix or template 12 of threshold values which are used in the thresholding process to determine which pixels will be printed for the halftone cell. The arrangement and magnitude of the threshold values for the individual pixels of the template 12 depends upon the threshold technique being used. In this embodiment, the threshold value distribution is of the type which provides cluster dot development of printed pixels. Template 12 may be the same for all of the input halftone cells 10 contained in the input data, or different threshold distributions within the template 12 may be used depending upon the gradient or distribution of the dense pixels within the halftone cell 10. In this specific embodiment, the density gradient of pixels within the halftone cell 10 indicates that the densest pixels in the cell 10 are concentrated in the upper left-hand corner of the halftone cell. For the purposes of this embodiment, the template 12 is selected which includes the lowest threshold values in the upper left-hand corner region of the template 12. Therefore, the dots of the cluster will develop beginning at the upper left-hand corner of the halftone cell area. Regardless of the distribution and magnitude of the individual threshold values in the template 12, such values are used to determine which pixels in the output cell 14 will be printed or rendered by the output device, or print engine. In this embodiment, the pixels 16, 18, 20, 22, 24 and 26 are printed for the output cell 14, and the remaining pixels are not printed.

The decision or determination whether to print the individual pixels in the output cell 14 is based upon the input values, the threshold values, the technique used for thresholding, and the diffusion of any error from one portion of the halftone cell to another. The output cell 14 is shown divided into four subcells A, B, C and D. Each subcell, in this specific embodiment, includes four individual pixel areas which can be printed by the binary rendering device or left blank. For example, subcell A includes the pixels 16, 18, 24 and 26. These subcells have corresponding pixel areas or subcells in the input cell 10 and the threshold template 12, with the letter designators being omitted for clarity. For example, the input values of 200, 200, 160 and 180 in cell 10 correspond to a divided subcell A therein, and threshold values of 4, 20, 35 and 60 in template 12 correspond to the same subcell. Dividing the halftone cell into subcells permits the thresholding and diffusion technique to achieve a proper density level without losing sharpness detail in the data and requiring excessive computation. Also, some of the sharpness detail is provided by the template selection process in the gradient calculation and selection step.

FIG. 2 is a table of values which will be used in explaining the development of the pixels shown in FIG. 1. It should be remembered that image data would normally include many halftone cells similar to the one-cell area shown in FIG. 1 (cell 10). Referring to both FIGS. 1 and 2, the total input density for subcell A in halftone cell 10 is 740, which is the total of the individual pixel density values of 200, 200, 160 and 180. This provides an average input density for cell A of 185, as shown in FIG. 2. Assuming that this is the beginning of the thresholding process, an error of 0 has been propagated from other subcells in the input data. Since no correction from a previous error is required, the average density desired for the subcell A is 185, again assuming that the values are eight-bit density values between 0 and 255.

According to this embodiment, the average density desired value of 185 is thresholded by the four-pixel threshold values 4, 20, 35 and 60 indicated for the subcell A in template 12. Since the average density desired is greater than any of the threshold values, all four of the pixels 16, 18, 24 and 26 are printed, or designated for printing, in the output cell 14. This provides an average density rendered for the subcell A of 255, or the maximum amount which can be produced. However, since the desired value is only 185, an average error for the subcell A amounts to −70. In other words, the four pixels printed or rendered in subcell A produce a density which is 70 units greater than that desired for this subcell. Consequently, this error is propagated to subcell B and subcell C. In accordance with a simplistic description of the invention, one-half (−35) of the error is propagated to subcell B, and the other half is propagated to subcell C. It is within the contemplation of the invention that more sophisticated propagating techniques may be used. For example, the error from subcell A may be propagated to more than one subcell to the right of subcell A, with the contribution of the error to the particular subcell being weighted by a predetermined formula or pattern. A similar propagation scheme can be used for the propagation of the error in the vertical direction from the subcell A. Although an operating system may use values which have been rounded to whole numbers, the numbers shown in the table of FIG. 2 have been carried to two decimal places for clarity and understanding the relationship between the numbers. Consequently, the error propagated to subcell B is −35, and the error propagated to subcell C is −35. In this particular error propagating technique, no error is propagated to subcell D because of the error existing in subcell A.

Subcell B has a total input density of 580. This provides an average of 145 for the subcell B and, because of the error propagated from subcell A, the average desired density is 110. Applying this average density desired to the corresponding threshold values in subcell B of template 12 produces the Printing of pixels 20 and 22, since the threshold values of 75 and 100, respectively, are less than the average density desired. The remaining two pixels in the subcell B are not printed because their threshold values of 125 and 180 are greater than the average desired density. Since half of the subcell B has been designated for printing, the average density rendered value is 127.5, or 255/2. This causes an error of −17.5 for subcell B which is propagated to subcell D in the amount of −8.75 and to the next subcell to the right in another halftone cell, which is not shown in FIG. 1, in the amount of −8.75.

A similar analysis can be used on subcells C and D to determine the corresponding values indicated in FIG. 2 and the absence of any printed pixels in the subcells C and D of FIG. 1. This is primarily due to the fact that the average density values for the subcells C and D are less than any of the threshold values for these subcells after including errors from its neighboring subcells. The errors produced by not printing any pixels in these subcells indicate that the actually rendered densities for the subcells are below that desired. Thus, the propagated errors from subcells C and D add to the average density of adjacent subcells before the average density values are thresholded to determine which pixels to render. For example, the error propagated to subcell D is 31.25, which is the resulting error of −8.75 and +40 from subcells B and C, respectively. This results in an average density desired for subcell D of 116.25, which is below any of the four threshold values corresponding to subcell D.

In a general mathematical analysis of the thresholding and error diffusing technique, a determination is made as follows:

If $D_{avg} > T_{11}$, $Output_{11} = 225$ otherwise,
$Output_{11} = 0$  (1)

and $Error_{11} = D_{avg} - Output_{11}$,  (2)

where $D_{avg}$ is the average input density value for the subcell, $T_1$ is the threshold value for the coordinate indicated position or pixel in the subcell, and the Output and Error values are referenced to the same pixel position in the subcell. The values for the three remaining pixels of the subcell can be derived by the following:

if $D_{avg} > T_{12}$, $Output_{12} = 255$ otherwise, $Output_{12} = 0$  (3)

and $Error_{12} = D_{avg} - Output_{12}$  (4)

if $D_{avg} > T_{21}$, $Output_{21} = 255$ otherwise, $Output_{21} = 0$  (5)

and $Error_{21} = D_{avg} - Output_{21}$  (6)

if $D_{avg} > T_{22}$, $Output_{22} = 255$ otherwise, $Output_{22} = 0$  (7)

and $Error_{22} = D_{avg} - Output_{22}$.  (8)

The overall error is represented by:

$[Error]_{total} = [Error_{11} + Error_{12} + Error_{21} + Error_{22}]/4$  (9)

This provides a total average density value for the next subcell as indicated below:

$[D_{avg}]_{next\ subcell} = [D_{avg}]_{w/o\ correction} + W[Error]_{total}$  (10)

where W is a weighting factor which determines how much of the error from an adjacent subcell is applied to this particular subcell.

Figures 3, 4:
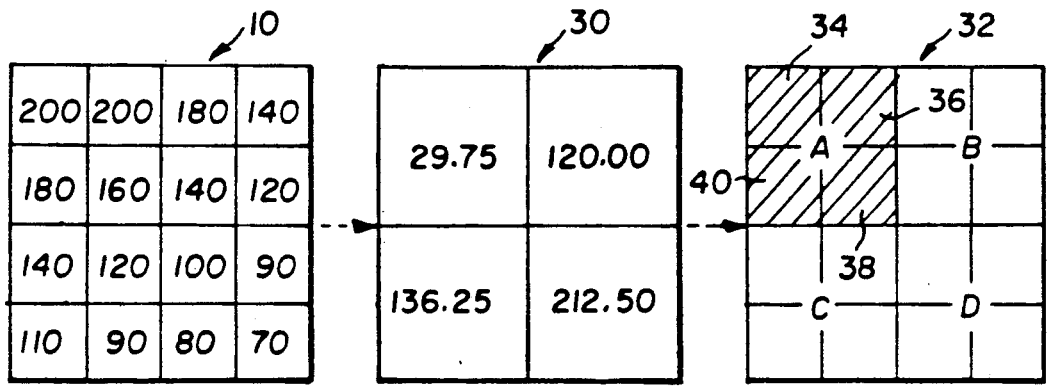
FIG. 3 is a diagram illustrating the development of a rendered halftone cell according to another embodiment of the invention.
FIG. 4 is a table of values used in the embodiment shown in FIG. 3.

FIG. 3 is a diagram illustrating the development of a rendered halftone cell according to another embodiment of the invention. For simplifying the description herein, the input halftone cell 10 shown in FIG. 3 contains the same input values as the cell 10 shown in FIG. 1. The threshold template 30 contains average threshold values for each subcell in the halftone cell. For example, in subcell B, the average of the individual threshold values of 75, 125, 100 and 180, as shown in FIG. 1, is 120. The pixels in the output cell 32 are developed by applying the average density value for the input data in halftone cell 10 to the average threshold values in template 30, and by diffusing any error between subcells. As discussed previously herein, the threshold values selected depend upon many things, including the type of thresholding, the density gradient of the input information, and the characteristics of the rendering device. The embodiment shown in FIG. 3 will lose more sharpness than the previous embodiment, although the template selection at the beginning will help to recover some of the sharpness.

FIG. 4 is a table of values used in explaining the pixel development in FIG. 3. Here again, the average density desired is 185 for the subcell A. Since this average density value is greater than the average threshold value of 29.75 for subcell A, all of the pixels 34, 36, 38 and 40 are printed in subcell A of output cell 32. This produces an average error for subcell A of −70 which is propagated to subcells B and C. In subcell B, the desired density value is 110, as in the previous embodiment. However, the threshold value is 120 which means that none of the pixels within subcell B will be printed. This produces an average error for subcell B of 110 which is propagated to subcell D and to an adjacent subcell not shown in FIG. 3. By continuing the analysis of FIG. 3 with the data shown in FIG. 4, it can be seen that the desired density values for the subcells C and D do not exceed the threshold values for these subcells, thus no pixels are designated for printing in subcells C and D. Since the rendered density is 0 in these subcells, as in subcell B, the error propagated is the same as the average density desired for these subcells. This is indicated by the error propagated values shown in FIG. 4.

The average density for a subcell can be expressed as:

$T_{avg} = [T_{11} + T_{12} + T_{21} + T_{22}]/4$.  (11)

The pixel rendering determination is provided by:

If $D_{avg} > T_{avg}$, $[Output]_{subcell} = 255$ otherwise,
$[Output]_{subcell} = 0$  (12)

and $[Error]_{hd\ subcell} = D_{avg} - [Output]_{subcell}$.  (13)

The total error is applied to adjacent subcells as previously indicated in expression (10).

By dividing the input data into halftone cells which are further subdivided into subcells and using an appropriate thresholding technique, the output cell of pixels to be printed can be developed. Error diffusion from subcell to subcell is used to further enhance the ability of the output cell to truly represent the gray-level input data in binary form.

Figures 5, 6, 7:
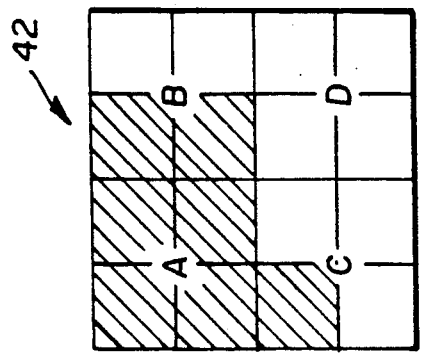
FIG. 5 is a table of values used in a third embodiment of the invention.
FIG. 6 is a four-pixel subcell with the pixels identified according to their use in the table of FIG. 5.
FIG. 7 is an output cell provided by the data and method illustrated in the table of FIG. 5.

A third embodiment of the invention is illustrated in FIGS. 5, 6 and 7. FIG. 5 is a table of values used in the calculations, FIG. 6 shows the placement within a subcell of the identified pixels in the table, and FIG. 7 represents the output cell provided by this embodiment when using the input values and threshold template shown in FIG. 1. According to this embodiment, and as tabulated in FIG. 5, each pixel in a subcell is thresholded with the corresponding threshold value. For subcell A, this results in four pixels being rendered in the output cell 42 (see FIG. 7). The difference between the desired and rendered values for subcell A is −280 which provides a pixel average for subcell A of −70. This is propagated as −35 to each of subcells B and C where it is used to adjust or compensate the density values before correction.

Figure 8:
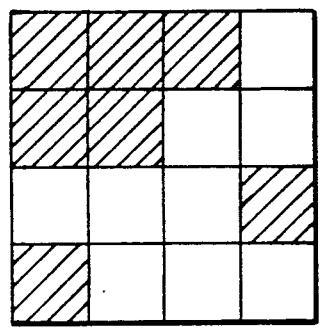
FIG. 8 is an output cell provided by a prior art method of error diffusion between each pixel in the halftone cell.

By progressing through the values in the table of FIG. 5, it can be seen that seven pixels in the output halftone cell 42 are rendered by this method of thresholding and error diffusion. Thus, the output halftone cell density is 255×7 or 1785, which is in error by 335 from the actual input value of 2120 for the halftone cell. This is as good as the error produced with pixel-to-pixel error diffusion within the halftone cell, but better in terms of the sharpness, or pixel locations, within the output cell. For comparison purposes, FIG. 8 is a halftone cell constructed from the input data and threshold template shown in FIG. 1, but using pixel-to-pixel error diffusion within the halftone cell.

This embodiment of the invention can be expressed as:

$$[D_{11}]_{next\ subcell} = [D_{11}]_{before\ correction} + E_{avg} \quad (14)$$

where $D_{11}$ is the density of the 11 pixel within the subcell (see FIG. 6), and the average error for the subcell $E_{avg}$ is given by:

$$E_{avg} = \Sigma_i W_i [\text{Error}]_{total\ average} \quad (15)$$

where $W_i$ is the weighting factor for error propagation and i indicates the subcells above and to the side of the current subcell.

If $[D_{11}]_{next\ subcell} > T_{11}$, Output$_{11}$=255 Otherwise,
Output$_{11}$=0 \quad (16)

and Error$_{11}$ = $[D_{11}]_{next\ subcell}$ − Output$_{11}$ \quad (17)

The remaining pixels in the subcell can be derived from the following:

If $[D_{12}]_{next\ subcell} > T_{12}$, Output$_{12}$=255 otherwise,
Output$_{12}$=0 \quad (18)

and Error$_{12}$ = $[D_{12}]_{next\ subcell}$ − Output$_{12}$ \quad (19)

If $[D_{21}]_{next\ subcell} > T_{21}$, Output$_{21}$=255 otherwise,
Output$_{21}$=0 \quad (20)

and Error$_{21}$ = $[D_{21}]_{next\ subcell}$ − Output$_{21}$ \quad (21)

If $[D_{22}]_{next\ subcell} > T_{22}$, Output$_{22}$=255 otherwise,
Output$_{22}$=0 \quad (22)

and Error$_{22}$ = $[D_{22}]_{next\ subcell}$ − Output$_{22}$. \quad (23)

The overall error is represented by:

$$[\text{Error}]_{total\ average} = [\text{Error}_{11} + \text{Error}_{12} + \text{Error}_{21} + \text{Error}_{22}]/4. \quad (24)$$

This embodiment is still more efficient than error diffusion on a pixel-to-pixel basis since $\Sigma_i W_i E_i$ for all pixels would have to be calculated for every pixel, not just once per subcell as used herein.

Figure 9:
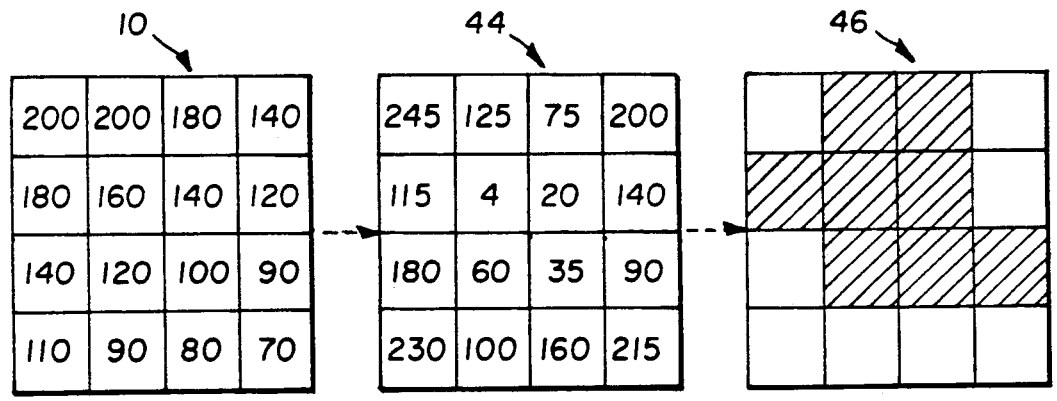
FIG. 9 is a diagram illustrating the development of a rendered halftone cell according to another novel arrangement.

FIG. 9 illustrates the development of a rendered halftone cell according to another novel arrangement of the invention. The data in the halftone cell 10 is thresholded, pixel-by-pixel, with the values in threshold template 44 to produce the rendered pixels in output cell 46. The same threshold template is used for adjacent halftone cells, thus saving a processing step of selecting a particular threshold matrix for the halftone cell data.

The total error is the difference between 255×8=2040 (the total density rendered) and the total density desired of 2120, which is equal to 80. The average error per pixel is propagated to the adjacent halftone cells. Thus, 40/16=2.5 is propagated to the halftone cell to the right, and an average error of 2.5 is propagated downward to the neighboring halftone cell. These values are used to adjust the input density values for each pixel in the neighboring halftone cells.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A method of processing image data for reproduction by a binary rendering device, said method including the steps of:

dividing the image data into a plurality of halftone cells;

subdividing the halftone cells into a plurality of subcells each containing a plurality of input pixels with corresponding input data values;

thresholding the image data to determine with pixels will be reproduced by a subcell by the binary rendering device;

calculating for an entire subcell, any error between the pixels to be rendered and the input data values for the pixels in the subcell; and comparing an average of the input data values of the pixels in the entire subcell to at least one threshold value.

2. The image processing method of claim 1 wherein the average of the input data values is compared with pixel threshold values for the subcell.

3. The image processing method of claim 1 wherein an average of the input data values is compared with the average of the pixel threshold values for the subcell.

4. The image processing method of claim 1 wherein the diffusing of the error changes an average value of the input data of the pixels in the other subcell by an amount dependent upon a magnitude of the error propagated to the other subcell.

5. The image processing method of claim 4 wherein the error is progagated to at least two other subcells, with both of the other subcells being adjacent to the subcell in which the error was determined, with one of the other subcells being substantially to one side of the error determined cell, and with one of the other subcells being substantially above or below the error determining cell.

6. The image processing method of claim 1 wherein the thresholding step compared individual input data values with corresponding threshold values on a pixel-by-pixel bases within the subcell, and wherein the calculated error is an error average produced by the pixel-by-pixel thresholding of all the pixels in the subcell.

7. A method of processing gray-level image data for reproduction by a binary rendering device, said method including the steps of:

dividing the image data into a plurality of halftone cells;

subdividing the halftone cells into a plurality of subcells each containing a plurality of input pixels with corresponding input data values;

acquiring data which has threshold levels for each pixel in the subcells;

comparing the average of the input data values of the pixels in an entire subcell to individual threshold levels for the subcells to determine which pixels will be reproduced for the subcell by the binary rendering device;

calculating, for an entire subcell, any error between the pixels to be rendered and the input data values for pixels in the subcell; and diffusing any calculated error to at least one other subcell, with said diffusing changing an average value of the input data of the pixels in the other subcell by an amount dependent upon a magnitude of the error propagated to the other subcell.

8. A method of processing gray-level image data for reproduction by a binary rendering device, said method including the steps of:

dividing the image data into a plurality of halftone cells;

subdividing the halftone cells into a plurality of subcells each containing a plurality of input pixels with corresponding input data values;

acquiring data which has an average threshold level for all of the pixels in the subcells;

comparing an average of the input data values of the pixels in an entire subcell to an average threshold level for the subcell to determine whether pixels will be reproduced for the subcell by the binary rendering device;

calculating, for the entire subcell, any error between the pixels to be rendered and the input data values for the pixels in the subcell; and diffusing any calculated error to at least one other subcell, with said diffusing changing the average value of the input data of the pixels in the other subcell by an amount dependent upon a magnitude of the error propagated to the other subcell.

9. A method of processing gray-level image data for reproduction by a binary rendering device, said method including the steps of:

dividing the image data into a plurality of four-by-four halftone cells containing sixteen pixels;

subdividing the halftone cells into four subcells each containing four input pixels with corresponding input data values;

acquiring data which includes at least one threshold level associated with the subcells;

comparing the average of the input data values of the pixels in the entire subcell to said at least one threshold level to determine if at least one pixel will be reproduced for the subcell by the binary rendering device;

calculating, for the entire subcell, any error between the pixels to be rendered and the input data values for the pixels in the subcell; and diffusing any calculated error to at least one other subcell, with said diffusing changing an average value of the input data of the pixels in the other subcell by an amount dependent upon a magnitude of the error propagated to the other subcell.

10. A method of processing image data for reproduction by a binary rendering device, said method including the steps of:

dividing the image data into a plurality of halftone cells each containing a plurality of input pixels with corresponding input data values;

thresholding, on a pixel-by-pixel basis, all of the input pixels in a halftone cell with a threshold template of values to determine which pixels will be reproduced for the halftone cell by the binary rendering device;

calculating, for the halftone cell, an average error between the pixels to be rendered and the input data values for the pixels in the halftone cell; and diffusing any calculated average error for the halftone cell to at least one neighboring halftone cell.

11. The image processing method of claim 10 wherein a threshold template is used in thresholding the pixels in all the halftone cells.

* * * * *